(12) United States Patent
Kumada

(10) Patent No.: US 10,202,074 B2
(45) Date of Patent: Feb. 12, 2019

(54) VEHICULAR TRANSMISSIVE MEMBER, VEHICULAR DECORATING DEVICE, AND VEHICULAR DECORATING METHOD

(71) Applicant: HONDA ACCESS CORP., Niiza-shi, Saitama (JP)

(72) Inventor: Akira Kumada, Niiza (JP)

(73) Assignee: HONDA ACCESS CORP., Niiza-shi (JP)

(*) Notice: Subject to any disclaimer, the term of this patent is extended or adjusted under 35 U.S.C. 154(b) by 0 days.

(21) Appl. No.: 15/442,916

(22) Filed: Feb. 27, 2017

(65) Prior Publication Data

US 2017/0253179 A1 Sep. 7, 2017

(30) Foreign Application Priority Data

Mar. 1, 2016 (JP) ................................ 2016-038897

(51) Int. Cl.
*B60Q 3/16* (2017.01)
*B60Q 3/60* (2017.01)
*B60Q 3/68* (2017.01)

(52) U.S. Cl.
CPC .................. *B60Q 3/60* (2017.02); *B60Q 3/16* (2017.02); *B60Q 3/68* (2017.02)

(58) Field of Classification Search
CPC .......... B60Q 3/1012; B60Q 3/01; B60Q 3/16; B60Q 3/18; B60Q 3/20; B60Q 3/208; B60Q 3/217; B60Q 3/233; B60Q 3/242; B60Q 3/252; B60Q 3/267; B60Q 3/54; B60Q 3/78; G01D 13/20; G09F 13/20; G09F 13/22; G09F 13/42; G09F 2013/222; G09F 2013/225; G09F 2013/227

See application file for complete search history.

(56) References Cited

U.S. PATENT DOCUMENTS

| 2,165,974 | A | * | 7/1939 | Land | ......................... G09F 19/18 |
| | | | | | 359/486.02 |
| 4,703,572 | A | * | 11/1987 | Chapin | ................... G09F 13/42 |
| | | | | | 250/461.1 |
| 5,566,025 | A | * | 10/1996 | Knoll | .................. G02B 27/0018 |
| | | | | | 359/13 |
| 5,585,160 | A | * | 12/1996 | Østhassel | ................ G09F 13/20 |
| | | | | | 40/539 |

(Continued)

FOREIGN PATENT DOCUMENTS

JP     2009-18747 A     1/2009
JP     2013-107547 A     6/2013

*Primary Examiner* — Alexander K Garlen
*Assistant Examiner* — Colin J Cattanach
(74) *Attorney, Agent, or Firm* — Westerman, Hattori, Daniels & Adrian, LLP

(57) ABSTRACT

This vehicular transmissive member includes: a first transmissive layer that is provided on a first side in a light passing direction and that has a first luminescent portion, which becomes visually recognizable by specific light; a second transmissive layer that is provided on a second side in the light passing direction further than the first transmissive layer and that has a second luminescent portion, which becomes visually recognizable by the specific light; and a light blocking layer that is provided between the first transmissive layer and the second transmissive layer and that blocks the specific light from passing through.

7 Claims, 3 Drawing Sheets

(56) References Cited

U.S. PATENT DOCUMENTS

| | | | | |
|---|---|---|---|---|
| 7,374,323 | B1* | 5/2008 | Kelman | G01D 11/28 116/286 |
| 8,770,812 | B2* | 7/2014 | Kino | B60Q 1/323 362/23.17 |
| 9,314,998 | B2* | 4/2016 | Labrot | B32B 17/10 |
| 9,423,665 | B2* | 8/2016 | Lin | G02F 1/163 |
| 9,495,040 | B2* | 11/2016 | Salter | G06F 3/042 |
| 9,851,072 | B2* | 12/2017 | Wagemans | F21V 9/00 |
| 9,964,675 | B2* | 5/2018 | Cross | G02B 5/22 |
| 2006/0012307 | A1* | 1/2006 | Bucher | B60Q 1/302 315/77 |
| 2006/0087826 | A1* | 4/2006 | Anderson, Jr. | B60K 35/00 362/23.01 |
| 2006/0256545 | A1* | 11/2006 | Wang | G01D 11/28 362/487 |
| 2007/0230170 | A1* | 10/2007 | Mita | G09F 13/04 362/231 |
| 2008/0253106 | A1* | 10/2008 | Sempel | F21V 3/04 362/84 |
| 2014/0355106 | A1* | 12/2014 | Laluet | B60J 1/02 359/359 |
| 2015/0367775 | A1* | 12/2015 | Aburto Crespo | G02B 6/102 362/510 |

\* cited by examiner

VEHICULAR TRANSMISSIVE MEMBER, VEHICULAR DECORATING DEVICE, AND VEHICULAR DECORATING METHOD

BACKGROUND OF THE INVENTION

Field of the Invention

The present invention relates to a vehicular transmissive member, a vehicular decorating device, and a vehicular decorating method.

The present application claims priority based on Japanese Patent Application No. 2016-038897 filed on Mar. 1, 2016, the contents of which are incorporated herein by reference.

Description of Related Art

In an interior structure of a vehicle, there is known a technique of providing a performance of light in which indistinct light flows or light with a pattern of characters or a logo indistinctly emerges.

For example Japanese Unexamined Patent Application, First Publication No. 2009-018747 discloses a technique including: a light diffusion plate which is installed in an interior decoration of a motor vehicle and a surface of which has a decorative design layer; and an LED (light emitting diode) that is installed on a rear surface side of the light diffusion plate, wherein light slits with transmittance are formed in the decorative design layer portion of the light diffusion plate. As a result, in a bright situation during the daytime or the like, the decorative design of the light diffusion plate is visually recognized while in a dark situation during the nighttime or the like, the decorative design is visually recognized in an indistinct manner with light emission of the LED from the rear side of the light diffusion plate.

For example, Japanese Unexamined Patent Application, First Publication No. 2011-107547 discloses a technique including: an ultraviolet ray emitting portion that is arranged on a vehicular interior side; a printed portion in black light ink that makes a predetermined pattern visually recognizable with an ultraviolet ray irradiated from the ultraviolet ray emitting portion; and a visible light ray emitting portion that is arranged on a side opposite to (rear side of) the vehicular interior. In this case, with the irradiation of ultraviolet ray from the ultraviolet ray emitting portion, the black light ink becomes luminescent in the predetermined pattern. Then, with the irradiation of light from the visible light ray emitting portion, light with clarity is visually recognized via the external surface skin.

SUMMARY OF THE INVENTION

However, in the technique described in Japanese Unexamined Patent Application, First Publication No. 2009-018747, a performance of light is available only when the LED is lit, and additionally, the decorative design has only a single pattern. Therefore, it was difficult to provide a wide variety of performances of light.

Furthermore, in the technique described in Japanese Unexamined Patent Application, First Publication No. 2013-107547, it is indeed possible to combine the irradiation of ultraviolet ray from the ultraviolet ray emitting portion and the irradiation of light from the visible light ray emitting portion. However, the combination is that of two types of decorative designs. Therefore, a new structure is desired for a wider variety of design expressions.

Therefore, the aspects of the present invention have been achieved in view of the aforementioned points, and have an object to provide a vehicular transmissive member, a vehicular decorating device, and a vehicular decorating method that are capable of providing a wide variety of design expressions through a performance of light.

To achieve the aforementioned object, a vehicular transmissive member, a vehicular decorating device, and a vehicular decorating method according to the aspects of the present invention adopt the following structures.

(1) A vehicular transmissive member according to a first aspect of the present invention includes: a first transmissive layer that is provided on a first side in a light passing direction and that has a first luminescent portion, which becomes visually recognizable by specific light; a second transmissive layer that is provided on a second side in the light passing direction further than the first transmissive layer and that has a second luminescent portion, which becomes visually recognizable by the specific light; and a light blocking layer that is provided between the first transmissive layer and the second transmissive layer and that blocks the specific light from passing through.

(2) a vehicular decorating device according to a second aspect of the present invention includes: the vehicular transmissive member as set forth in (1); a first light source that is provided on a first side in the light passing direction with respect to the vehicular transmissive member, and that irradiates the specific light onto the first transmissive layer; and a second light source that is provided on a second side in the light passing direction with respect to the vehicular transmissive member, and that irradiates the specific light onto, the second transmissive layer.

(3) Furthermore, in the vehicular decorating device according to the second aspect of the present invention, the vehicular transmissive member may be installed in a vehicular interior member: the first transmissive layer may face an external side of the vehicular interior member, and the second transmissive layer may face an internal side of the vehicular interior member; at least one of the first transmissive layer and the second transmissive layer may have a background pattern that is made visually recognizable by irradiation of visible light; and an inside of the vehicular interior member may be provided with the second light source and with a third light source that irradiates the visible light onto the vehicular transmissive member.

(4) a vehicular decorating method according to a third aspect of the present invention irradiates the specific light onto the vehicular transmissive member as set forth in (1) selectively or simultaneously from the first side and the second side in the light passing direction, to thereby make the first luminescent portion and the second luminescent portion visually recognizable selectively or simultaneously.

According to the first, second, or third aspect of the present invention, the first luminescent portion of the first transmissive layer is visually recognizable by specific light on the first side of the vehicular transmissive member in the light passing, direction while the second luminescent portion of the second transmissive layer is visually recognizable by the specific light on the second side of the vehicular transmissive member in the light passing direction. Therefore, for example, if the specific light is irradiated selectively from both sides of the vehicular transmissive member in the light passing direction, then it is possible to make the first luminescent portion and the second luminescent portion visually recognizable in a selective manner; and if the specific light is irradiated simultaneously from both sides of the vehicular transmissive member in the light passing direction, then it is possible to make the first luminescent portion and the second luminescent portion visually recognizable in an overlapped state. Furthermore, if a background pattern that is visually recognizable by visible light is combined, then a wider variety of design expressions are made available. Thus, with the first transmissive layer and the second transmissive layer that have different decorative patterns being combined, it is possible to doubly obtain a delicate performance of light that is difficult to obtain only by the passing through of light. Therefore, it is possible to provide a wider variety of design expressions.

Furthermore, between the first transmissive layer and the second transmissive layer, the light blocking layer that blocks the specific light from passing through is provided. Therefore, by the same specific light, it is possible to make the first luminescent portion and the second luminescent portion visually recognizable selectively. Consequently, it is possible to reduce the types of component parts, to thereby make the structure simple.

Furthermore, with a structure in which the first luminescent portion and the second luminescent portion becomes excitation-luminescent by invisible light such as an ultraviolet ray, it is possible to perform decoration while suppressing an influence on the surroundings more than the case of direct visual recognition with visible light.

Furthermore, with the brightnesses and the lighting timings of the first luminescent portion and the second luminescent portion being modified, it is possible to achieve an exquisite and surprising performance of light.

According to (3) as described above, when visible light is present, for example, during the daytime, under an outdoor light, or in other situations, the background pattern(s) of at least one of the first transmissive layer and the second transmissive layer are made visually recognizable. As a result, it is possible to hide the inside of the vehicular interior member to improve the appearance, and is also possible to make a wider variety of design expressions available. Furthermore, even during the nighttime or the like, the background pattern(s) of at least one of the first transmissive layer and the second transmissive layer are made visually recognizable by the third light source. At this time, the background pattern(s) are made visually recognizable by luminescence from inside. This makes the impression different from the case where the background pattern(s) are visually recognized by visible light from outside. Thus, it is possible to perform decoration with a variety of patterns in which the background pattern, the first luminescent portion, and the second luminescent portion are appropriately combined. Furthermore, with the impression of the background pattern being made different between day and night, performance effect during the nighttime is also enhanced, to thereby make it possible to further improve the decorative function.

DESCRIPTION OF EMBODIMENTS

Hereunder is a description of an embodiment of the present invention with reference to the drawings.

Figure 1:
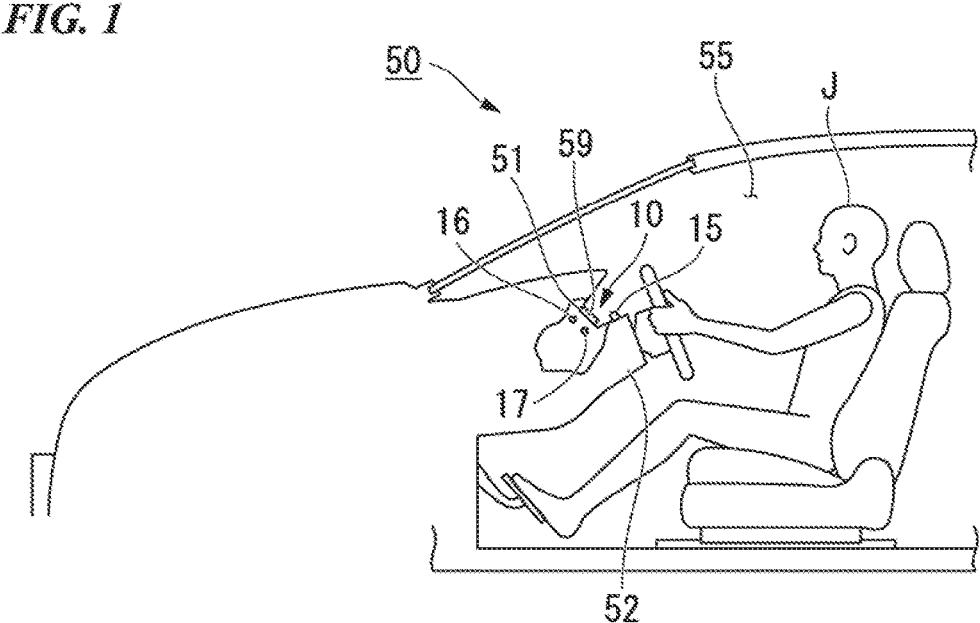
FIG. 1 is a side of a vehicle according to one aspect of the present invention.

As shown in FIG. 1, a vehicle 50 includes an instrument panel 51 in a vehicle interior (passenger compartment) 55. In a visually-recognized portion that is visually recognized by a driver or passenger J, the instrument panel 51 has a panel installation plate portion (base plate portion) 59 that is formed of, for example, a resin member with transmittance. Together with a first transmissive layer 12, a light blocking layer 13, and a second transmissive layer 14 (described later), the panel installation plate portion 59 constitutes a vehicular transmissive panel (vehicular transmissive member) 10 of the present embodiment. Note that the panel installation plate portion 59 is formed of a transparent or translucent material, and may have a plurality of slits or holes.

Figure 2:
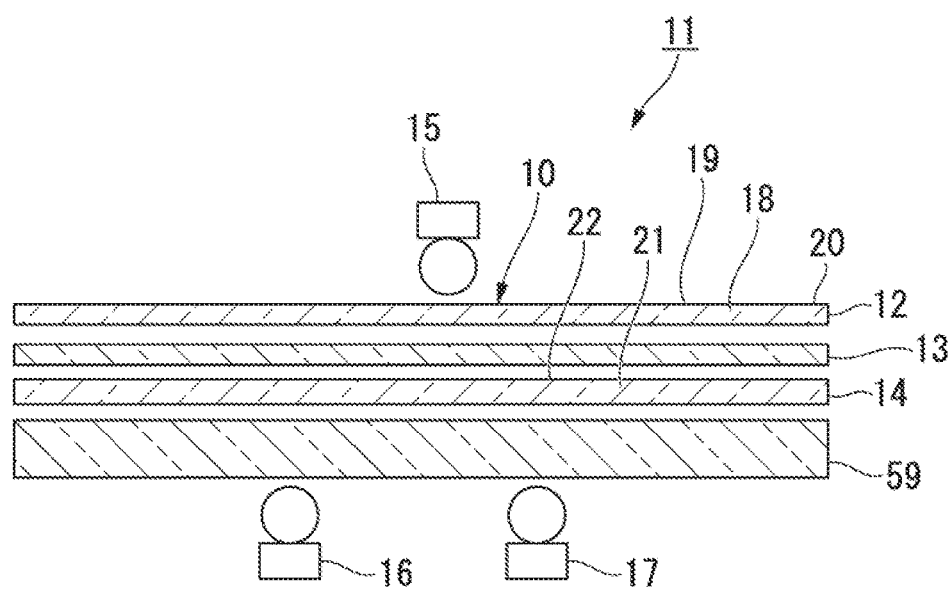
FIG. 2 is a cross-sectional view of a vehicular transmissive panel in a vehicular decorating device according to one aspect of the present invention.

As shown in FIG. 2, the vehicular transmissive panel 10 includes: the panel installation plate portion 59; a first transmissive layer 12; a light blocking layer 13; and a second transmissive layer 14. The vehicular transmissive panel 10 is made by stacking the first transmissive layer 12, the light blocking layer 13, the second transmissive layer 14, and the panel installation, plate portion 59 in this order from the visually-recognized side (vehicle interior 55 side) of the instrument panel 51. The vehicular transmissive panel 10 is included in a vehicular decorating device 11. The vehicular decorating device 11 includes; the vehicular transmissive panel 10; a first light source 15; a second light source 16, and a third light source 17.

The first transmissive layer 12 is, for example, formed of a transparent resin film with transmittance or by printing. The first transmissive layer 12 is provided on the visually-recognized side (vehicle interior 55 side), which is visually recognized by the driver or passenger J, of the vehicular transmissive panel 10 in a thickness direction (light passing direction). In the first transmissive layer 12, a first luminescent portion (see FIG. 4) 19 with a polka-dot pattern or the like, which reacts to specific light (for example, a UV ray (ultraviolet ray)) to be excitation-luminescent, is printed on a film main body 18. The film luminescent portion 19 is, for example, printed in black light ink (ink that becomes luminescent by black light ink, invisible ink). Note that the first luminescent portion 19 may be monochrome or colored. It is possible to optionally select the pattern of the first luminescent portion 19. The surface of the first transmissive layer 12 may be subjected to coating for preventing scratches.

Furthermore, in the first transmissive layer 12, a background pattern (see FIG. 3) 20 different from that of the first luminescent portion 19 is printed on the film main body 18. The background pattern 20 is, for example, a wood-grain pattern, and is visually recognizable from the vehicle interior 55 by irradiation or passing through of visible light. Note that the pattern of the background pattern 20 is appropriately selectable.

The second transmissive layer 14 is formed of a transparent resin film with transmittance or by printing. The second transmissive layer 14 is provided on a rear surface side (panel installation plate portion 59 side), which is not visually recognized by the driver or passenger J, of the vehicular transmissive panel 10 in the thickness direction (light passing direction). In the second transmissive layer 14, a second luminescent portion (see FIG. 5) 22 with a flower pattern or the like, which reacts to specific light (for example, a UV ray) to excitation-luminescent, is printed on a film main body 21. The second luminescent portion 22 is, for example, printed in black light ink (ink that becomes luminescent by black light ink). Note that the second luminescent portion 22 may be monochrome or colored. It is possible to optionally select the pattern of the second luminescent portion 22.

The light blocking layer 13 is sandwiched between the first transmissive layer 12 and the second transmissive layer 14, and blocks the UV light corresponding to the specific light from passing through between the first transmissive layer 12 and the second transmissive layer 14.

The first light source 15 has a function of irradiating the UV light corresponding to the specific light onto the first transmissive layer 12. The first light source 15 is provided on a first side (in the vehicle interior 55) of the vehicular transmissive panel 10 in the thickness direction (light passing direction). The first light source 15 is, for example, a UV light (so-called black light) of LED (light emitting diode) type that is arranged in a steering column 52. The first light source 15 is electrically connected to a power source circuit (not shown in the figure), and irradiates UV light onto the first transmissive layer 12 with the activation of the power source circuit. Note that as the first light source 15, an electric bulb, an organic EL, or the like may be used instead of an LED. The first light source 15 may be arranged not only in the steering column 52, but instead in one of the various portions of a meter visor, a roof, a rearview mirror, and a room lamp. Alternatively, the first light source 15 may irradiate light onto the first transmissive layer 12 from the interior of the instrument panel 51 by use of a light guiding member.

The second light source 16 has a function of irradiating the UV light corresponding to the specific light onto the second transmissive layer 14. The second light source 16 is provided on a second side (in the instrument panel 51) of the vehicular transmissive panel 10 in the thickness direction (light passing direction). The second light source 16 is, for example, a UV light of LED type similar to the first light source 15. The second light source 16 is electrically connected to a power source circuit, for example, similar to that of the first light source 15, and irradiates UV light onto the second transmissive layer 14 with the activation of the power source circuit. Note that as the second light source 16, an electric bulb, an organic EL, or the like may be used instead of that of LED type. The second light source 16 may irradiate light onto the second transmissive layer 14 from the exterior of the instrument panel 51 by use of a light guiding member.

The third light source 17 has a function of irradiating visible light onto the vehicular transmissive panel 10.

The third light source 17 is provided on a second side (in the instrument panel 51) of the vehicular transmissive panel 10 in the thickness direction (light passing direction). The third light source 17 is, for example, a white light of LED type, and is provided in parallel to the second light source 16. The third light source 17 is electrically connected to a power source circuit, for example, similar to that of the first light source 15 and the second light source 16, and irradiates visible light onto the vehicular transmissive panel 10 via the panel installation plate portion 59 with the activation of the power source circuit. Note that as the third light source 17, an electric bulb, an organic EL, or the like may be used instead of that of LED type. The third light source 17 may irradiate light onto the vehicular transmissive panel 10 from the exterior of the instrument panel 51 by use of a light guiding member.

Next is a description of workings of the present embodiment.

Figure 3:
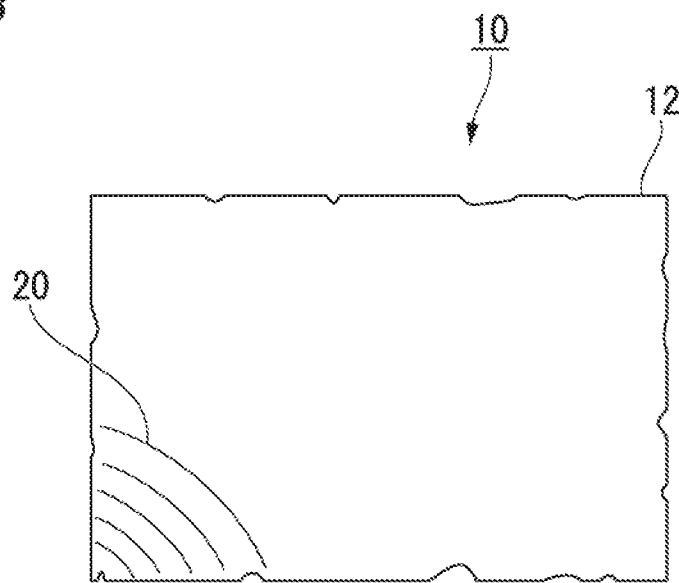
FIG. 3 is a plan view showing a background pattern of a first transmissive layer in the vehicular transmissive panel.

As shown in FIG. 3, when visible light is present, for example, during the daytime, under an outdoor light, or in other situations, the visible light is irradiated onto the vehicular transmissive panel 10. With the visible light, the first luminescent portion 19 of the first transmissive layer 12 and the second luminescent portion 22 of the second transmissive layer 14 will not become excitation-luminescent. Therefore, only the background pattern 20 of the first transmissive layer 12 is visually recognized by the driver or passenger J. At this time, the background pattern 20 of the first transmissive layer 12 is visually recognized to hide the interior of the vehicular transmissive panel 10. Therefore, it is possible to improve the appearance.

In a state where no visible light is present during the nighttime or in other situations, the third light source 17 is lit to irradiate visible light onto the vehicular transmissive panel 10 from the interior of the instrument panel 51. The visible light passes through the panel installation plate portion 59 and enters the second transmissive layer 14. The visible light having entered the second transmissive layer 14 is not UV light. Therefore, the visible light passes through with it causing the second luminescent portion 22 to become excitation-luminescent. Furthermore, the visible light passes through the light blocking layer 13 and enters the first transmissive layer 12. The visible light having entered the first transmissive layer 12 is not UV light. Therefore, the visible light passes through without causing the first luminescent portion 19 to become excitation-luminescent. At this time, the visible light causes the background pattern 20 to emerge in the first transmissive layer 12 through internal luminescence, to thereby make the background pattern 20 visually recognizable to the driver or passenger J.

Figure 4:
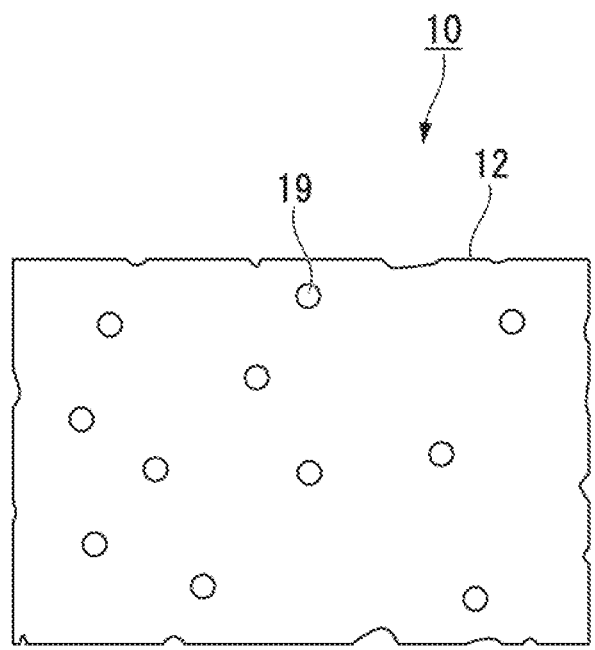
FIG. 4 is a plan view showing a pattern of a first luminescent portion of the first transmissive layer in the vehicular transmissive panel.

As shown in FIG. 4, when the first light source 15 is lit, the UV light of the first light source 15 is irradiated onto the first transmissive layer 12. The UV light irradiated onto the first transmissive layer 12 causes the first luminescent portion 19 of the first transmissive layer 12 to become excitation-luminescent, and thus causes the pattern of the first luminescent portion 19 to emerge, to thereby make the pattern visually recognizable to the driver or passenger J. At this time, the UV light of the first light source 15 is cut by the light blocking layer 13. Therefore, the UV light does not reach the second transmissive layer 14, and hence, the excitation-luminescence of the second luminescent portion 22 is inhibited. This makes the pattern of the first luminescent portion 19 visually recognizable to the driver or passenger J without allowing the pattern of the second luminescent portion 22 to be visually recognized.

At this time, because the background pattern 20 of the first transmissive layer 12 is hardly recognized visually if it is during the nighttime, only the first luminescent portion 19 of the first transmissive layer 12 is caused to emerge with emphasis. On the other hand, if it is during the daytime, the background pattern 20 of the first transmissive layer 12 and the pattern of the first luminescent portion 19 are visually recognized in a mixed manner by the driver or passenger J. Furthermore, even during the nighttime, with the third light source 17 being lit, the background pattern 20 with an impression different from that of daytime and the pattern of the first luminescent portion 19 are made visually recognizable in a combined manner to the driver or passenger J. Furthermore, with brightnesses and lighting timings of the first light source 15 and the third light source 17 being changed, it is possible to achieve an exquisite and surprising performance of light.

Figure 5:
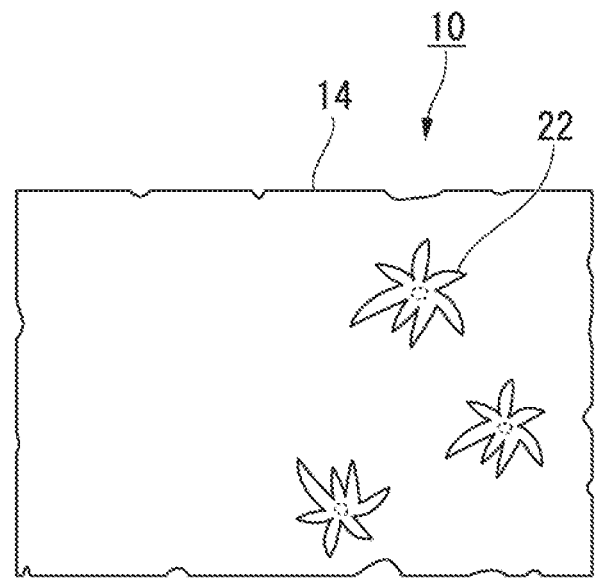
FIG. 5 is a plan view showing a pattern of a second luminescent portion of a second transmissive layer in the vehicular transmissive panel.

As shown in FIG. 5, when the second light source 16 is lit, the UV light of the second light source 16 is irradiated onto the vehicular transmissive panel 10. The UV light having entered the vehicular transmissive panel 10 passes through the panel installation plate portion 59 and enters the second transmissive layer 14. The UV light having entered the second transmissive layer 14 causes the second luminescent portion 22 of the second transmissive layer 14 to become excitation-luminescent, and thus causes the pattern of the second luminescent portion 22 to emerge, to thereby make the pattern visually recognizable to the driver or passenger J. At this time, the UV light of the second light source 16 is cut by the light blocking layer 13. Therefore, the UV light does not reach the first transmissive layer 12, and hence, the excitation-luminescence of the first luminescent portion 19 is inhibited. This makes the pattern of the second luminescent portion 22 visually recognizable to the driver or passenger J without allowing the pattern of the first luminescent portion 19 to be visually recognized.

At this time, because the background pattern 20 of the first transmissive layer 12 is hardly recognized visually if it is during the nighttime, only the pattern of the second luminescent portion 22 of the second transmissive layer 14 is caused to emerge with emphasis. On the other hand, if it is during the daytime, the background pattern 20 of the first transmissive layer 12 and the pattern of the second luminescent portion 22 are visually recognized in a mixed manner by the driver or passenger J. Furthermore, even during the nighttime, with the third light source 17 being lit, the background pattern 20 with an impression different from that of daytime and the pattern of the second luminescent portion 22 are made visually recognizable in a combined manner to the driver or passenger J. Furthermore, with brightnesses and lighting timings of the second light source 16 and the third light source 17 being changed, it is possible to achieve an exquisite and surprising performance of light.

Figure 6:
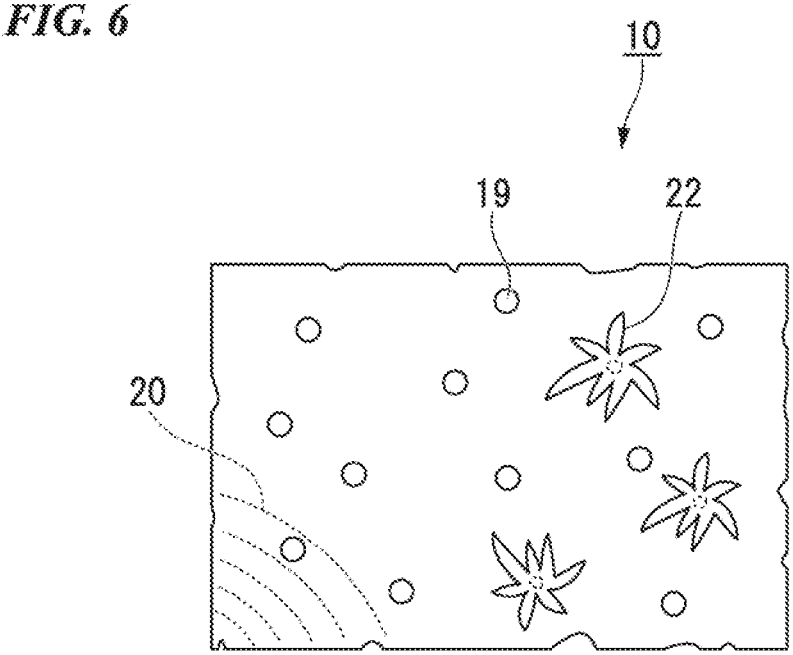
FIG. 6 is a plan view in winch the patterns of the first transmissive layer and second transmissive layer in the vehicular transmissive panel are superposed.

As shown in FIG. 6, when the first light source 15 and the second light source 16 are light simultaneously, the first luminescent portion 19 of the first transmissive layer 12 is caused to become excitation-luminescent by the UV light of the first light source 15, to thereby cause the pattern of the first luminescent portion 19 to emerge. At the same time, the second luminescent portion 22 of the second transmissive layer 14 is caused to become excitation-luminescent by the UV light of the second light source 16, to thereby cause the pattern of the second luminescent portion 22 to emerge. As a result, the pattern of the first luminescent portion 19 and the pattern of the second luminescent portion 22 are combined to be made visually recognizable to the driver or passenger J.

At this time, because the background pattern 20 of the first transmissive layer 12 is hardly recognized visually if it is during the nighttime, only both patterns of the first luminescent portion 19 and second luminescent portion 22 are caused to emerge with emphasis. On the other hand, if it is during the daytime, the background pattern 20 of the first transmissive layer 12 and both patterns of the first luminescent portion 19 and second luminescent portion 22 are visually recognized in a mixed manner by the driver or passenger J. Furthermore, even during the nighttime, with the third light source 17 being lit, the background pattern 20 with an impression different from that of daytime and both patterns of the first luminescent portion 19 and second luminescent portion 22 are made visually recognizable in a combined manner to the driver or passenger J. Furthermore, with brightnesses and lighting timings of the first light source 15, the second light source 16, and the third light source 17 being changed, it is possible to achieve an exquisite and surprising performance of light.

At this time, with a control circuit, a timer circuit, a switch (not shown in the figure), and the like being applied, it is possible to optionally combine the timing to light the first light source 15 and the timing to light the second light source 16. This makes it possible to optionally modify the combination of the first luminescent portion 19 of the first transmissive layer 12 and the second luminescent portion 22 of the second transmissive layer 14 with a passage of time. Therefore, it is possible to create an emotional, composite pattern in which a mixture of the first luminescent portion 19 and the second luminescent portion 22 are mixed. Furthermore, with brightness of each light source being increased or decreased, it is possible to further increase the variations of performance of light. The timing to light each light source and the timing to increase or decrease the brightness of each light source may be determined in response to the opening and closing of the doors, to operations on switches, and to other operations.

As has been described above, the vehicular transmissive panel 10 of the present embodiment includes: a first transmissive layer 12 that is provided on a first side in a light passing direction and that has a first luminescent portion 19, which becomes visually recognizable by specific light (UV light); a second transmissive layer 14 that is provided on a second side in the light passing direction further than the first transmissive layer 12 and that has a second luminescent portion 22, which becomes visually recognizable by the specific light; and a light blocking layer 13 that is provided between the first transmissive layer 12 and the second transmissive layer 14 and that blocks the specific light from passing through.

Therefore, with the specific light being irradiated onto the vehicular transmissive panel 10 selectively or simultaneously from the first side and the second side in the light passing direction, it is possible to make the first luminescent portion 19 and the second luminescent portion 22 visually recognizable selectively or simultaneously. Furthermore, with the background pattern 20, which is visually recognizable by visible light, being combined, it is possible to provide a wider variety of design expressions.

Furthermore, the vehicular decorating device 11 of the present embodiment includes: a first light source 15 that is provided on a first side in the light passing direction with respect to the vehicular transmissive panel 10, and that irradiates the specific light onto the first transmissive layer 12; a second light source 16 that is provided on a second side in the light passing direction with respect to the vehicular transmissive panel 10, and that irradiates the specific light onto the second transmissive layer 14; and a third light source 17 that is provided on a second side in the light passing direction with respect to the vehicular transmissive panel 10, and that irradiates the visible light onto the second transmissive layer 14, wherein at least one of the first transmissive layer 12 and the second transmissive layer 14 has a background pattern 20 that is made visually recognizable by irradiation of visible light.

Therefore, when it is possible to irradiate the specific light from the first and second sides in the light passing direction by use of the first light source 15 and the second light source 16 and also when visible light is present, for example, during the daytime, under an outdoor light, or in other situations, then the background pattern 20 of the first transmissive layer 12 is made visually recognizable; and, furthermore, even during the nighttime or in other situations, the background pattern 20 of the first transmissive layer 12 is made visually recognizable by use of the third light source 17. Thus, it is possible to express various designs. Furthermore, with the impression of the background pattern 20 being made different between day and night, performance effect during the nighttime is also enhanced, to thereby thither improve the decorative function.

Note that the present invention is not limited to the aforementioned embodiment, and that various modifications can be made without departing from the spirit or scope thereof.

For example, the first light source 15, the second light source 16, and the third light source 17 each are not limited to single use, and a plurality of them may be clustered or aligned.

Furthermore, the vehicular transmissive member may be installed not only in the instrument panel 51, but instead in various locations such as a door trim, a roof lining, a center console, a pillar garnish, a steeling wheel, a mirror, and a front or side windshield.

Furthermore, the vehicular transmissive member may be installed not only inside the vehicle interior 55, but instead outside the vehicle interior 55. Light may be irradiated onto a vehicular transmissive member independent of the vehicle members from both sides in the lift passing direction. The second transmissive layer 14 may have a background pattern 20.

Furthermore, the vehicular transmissive member may have a structure in which the panel installation plate portion 59 is sandwiched between the first transmissive layer 12 and the second transmissive layer 14, and may also have not only a panel-like shape but instead various shapes such as a block-like one. Furthermore, not only UV light and invisible ink that reacts thereto may be combined, but instead other invisible light and invisible ink may be combined.

Furthermore, the vehicular transmissive member may include a base plate portion independent of vehicular interior members. Furthermore, the vehicular transmissive member may be one that keeps its shape only by the first transmissive layer 12, the second transmissive layer 14, and the light blocking layer 13, without including a base plate portion. Furthermore, the vehicular transmissive member may be a three-layer sheet made only of the first transmissive layer 12, the second transmissive layer 14, and the light blocking layer 13. The first transmissive layer 12, the second transmissive layer 14, and the light blocking layer 13 each are not limited to a single layer, but may be made of a plurality of layers.

Furthermore, the structure of the aforementioned embodiment is merely an example of the present invention, and various modifications can be made without departing from the spirit or scope of the present invention.

What is claimed is:

1. A vehicular decorating device, comprising:
    a vehicular transmissive member, comprising:
        a first transmissive layer that is provided on a first side in a light passing direction and that has a first luminescent portion, which becomes visually recognizable by specific light;
        a second transmissive layer that is provided on a second side in the light passing direction further than the first transmissive layer and that has a second luminescent portion, which becomes visually recognizable by the specific light; and
        a light blocking layer that is provided between the first transmissive layer and the second transmissive layer and that blocks the specific light from passing through;
    a first light source that is provided on a first side in the light passing direction with respect to the vehicular transmissive member, and that irradiates the specific light onto the first transmissive layer;
    a second light source that is provided on a second side in the light passing direction with respect to the vehicular transmissive member, and that irradiates the specific light onto the second transmissive layer; and
    a third light source that is provided on the second side in the light passing direction with respect to the vehicular transmissive member, and that irradiates visible light onto the vehicular transmissive member,
    wherein the first light source and the second light source emit an identical spectrum of wavelengths of light,
    wherein the third light source emits a different spectrum of wavelengths of light as compared to the first light source and the second light source,
    wherein at least one of the first transmissive layer and the second transmissive layer has a background pattern that is made visually recognizable by irradiation of the visible light,
    wherein the first light source, the second light source and the third light source are configured so as to be individually illuminated selectively or simultaneously, and
    wherein the background pattern is different from a pattern of the first luminescent portion and the second luminescent portion.

2. The vehicular decorating device according to claim 1, wherein the vehicular transmissive member is installed in a vehicular interior member,
    wherein the first transmissive layer faces an external side of the vehicular interior member, and the second transmissive layer faces an internal side of the vehicular interior member, and
    wherein an inside of the vehicular interior member is provided with the second light source and with the third light source.

3. A vehicular decorating method, comprising:
    a first step of including the vehicular transmissive member, the first light source, the second light source, the third light source and the background pattern according to claim 1; and
    a second step of irradiating a specific light and a visible light onto the vehicular transmissive member individually selectively or simultaneously from a first side and a second side in a light passing direction, to thereby make a first luminescent portion, a second luminescent portion, and the background pattern visually recognizable selectively or simultaneously.

4. The vehicular decorating device according to claim 1, wherein the specific light is ultraviolet light.

5. The vehicular decorating device according to claim 1, wherein only the first transmissive layer has the background pattern.

6. The vehicular decorating device according to claim 1, wherein only the second transmissive layer has the background pattern.

7. The vehicular decorating device according to claim 1, wherein both the first transmissive layer and the second transmissive layer have the background pattern.

* * * * *